United States Patent

[11] 3,562,429

| [72] | Inventor | Roger A. West<br>Stanford, Calif. |
| --- | --- | --- |
| [21] | Appl. No. | 724,729 |
| [22] | Filed | Apr. 29, 1968 |
| [45] | Patented | Feb. 9, 1971 |
| [73] | Assignee | Teachout West Electro-Acoustics<br>San Francisco, Calif.<br>a partnership |

[54] SOUND TRANSMITTER WITH FEEDBACK AND POLARIZATION CIRCUITRY
4 Claims, 7 Drawing Figs.

[52] U.S. Cl. .................................................. 179/1,
179/111
[51] Int. Cl. ...................................................... H04r 19/00
[50] Field of Search ............................................ 179/1F, 111

[56] References Cited
UNITED STATES PATENTS

| 2,387,845 | 10/1945 | Harry ........................... | 179/1 |
| --- | --- | --- | --- |
| 3,061,675 | 10/1962 | MacDonald ................. | 179/1 |
| 3,136,867 | 6/1964 | Brettell ........................ | 179/111 |
| 3,008,014 | 11/1961 | Williamson et al. .......... | 179/111 |
| 3,009,991 | 11/1961 | Bekey et al. ................. | 179/1 |

Primary Examiner—Kathleen H. Claffy
Assistant Examiner—Douglas W. Olms
Attorney—Julian Caplan ABSTRACT: A sound transmitter system utilizing a solid electrolyte battery as a permanent polarization source, and utilizing motional and remote feedback systems.

PATENTED FEB 9 1971 3,562,429

INVENTOR.
ROGER M. WEST
BY Julian Caplan
ATTORNEY

PATENTED FEB 9 1971

INVENTOR.
ROGER M. WEST

BY Julian Caplan

ATTORNEY

SOUND TRANSMITTER WITH FEEDBACK AND POLARIZATION CIRCUITRY

A principal objection to prior electrostatic speakers is the requirement of a polarizing reference field previously derived from either a DC power supply or from ordinary batteries. Such power supplies were deficient from a point of view of bulk, and dependency upon power mains. Conventional batteries, on the other hand, are expensive and have a very short functional life as compared to the permanent magnetic field of competing electromagnetic speakers. A principal feature of the present invention is the use of a solid electrolyte battery as a permanent polarizing source which provides a stable source of DC high voltage with a very long functional lifetime.

A further feature of the invention is that the solid electrolyte polarizing battery has a life expectancy on the order of 66 years, even at elevated temperatures as high as 60° C.

A further feature of the solid electrolyte battery as a polarizing source is its excellent voltage stability, low cost, maintenance-free, long life, inherent protection against short circuits, low inherent noise, and mechanically rugged construction.

A still further feature of the invention is the provision of a motional feedback system in the form of distributed rigid feedback electrodes in conjunction with a series of fixed driving electrodes and shielding electrodes provided to reduce distortion products of the electrostatic speaker which are caused by certain physical nonlinearities and improper acoustic loading.

Another advantage of the invention is the provision of motional feedback in the form of a push-pull balanced feedback system provided in a symmetrical configuration around the electrostatic transmitter diaphragm.

A still further feature of the present system is the provision of a remote feedback microphone activated by acoustic energy produced by a sound transmitter, to provide sound control at any point in space activated by the acoustic energy of the transmitter.

In prior systems, the acoustic transmitter and the transmission path are not normally included in a closed-loop system. In the present invention, a remote microphone samples at a point in space the acoustic energy emanating from the transmitter. The electrical output of the microphone is then processed to obtain a proper amplitude, phase characteristic and frequency spectrum and is then applied as a feedback signal at a summing point in the system. Hence, the acoustic transmitter and transmission path appear within a closed-loop feedback system. Due to remote feedback, but depending on the system feedback parameters (i.e., microphone directivity, sensitivity; and processing of the microphone signal such as filtering, phase shifting, time delay, etc.), the sound within the immediate acoustic environment of the remote microphone(s) is functionally related to the signal applied at the input of the system. This would permit adverse factors in the transmission path to be minimized (unwanted noises, nonlinearities, improper acoustics, etc.) and also reduce the effects of transmitter nonlinearities. Also, an artificial reverberation effect could be created by using a small amount of positive feedback in the proper phase and amplitude. This closed-loop concept would find use in modifying room acoustics, audiology, and whenever an airborne acoustic signal is employed.

Other objects of the present invention will become apparent upon reading the following specification and referring to the accompanying drawings in which similar characters of reference represent corresponding parts in each of the several views.

Figure 1:
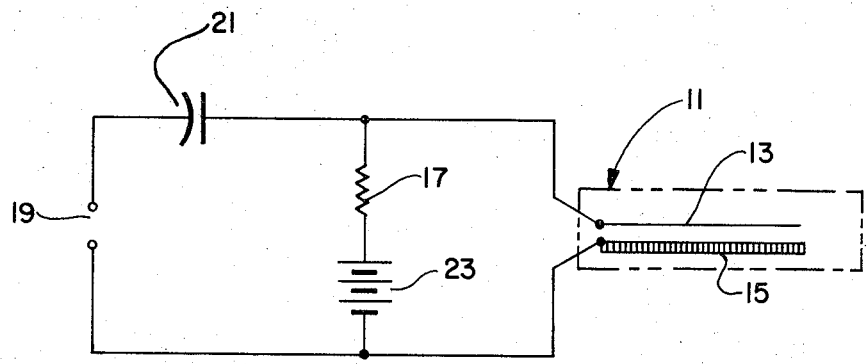
FIG. 1 is a schematic diagram of a single-ended electrostatic sound transmitter circuit embodying the present invention.

The electrostatic sound transducer 11 (herein referred to as EST, it being understood that the term is inclusive of all sound transducer systems including speakers, earphones, etc.) consists of a compliant electrically conductive diaphragm 13 separated from a stationary, conductive electrode 15. Generally, diaphragm 13 and fixed electrode 15 assume a planar geometry. Diaphragm 13 is electrically charged with respect to electrode 15 through a large resistance 17, such that the time constant of the polarizing system is much longer in duration than the period of the lowest signal frequency of interest. When this condition obtains, the electrically charged diaphragm 13 appears electrically as a sheet of fixed, constant charge. When a varying electrical field is superimposed upon the static field, the electrostatic force is increased and reduced, in a manner corresponding to the signal variation imposed at signal input 19. The varying electrostatic force causes the compliant diaphragm 13 to vibrate accordingly and thereby produce acoustic energy and sound corresponding to the audio frequency signal applied. Coupling capacitor 21 is provided to isolate the signal source from the DC polarizing potential 23.

The electrostatic transducer system described has several inherent advantages over its electromagnetic counterpart used for the same purpose. The force vector in the electromagnetic transducer (EMT) is usually applied at a point near the apex of a conical diaphragm. In such a construction, only a small portion of the diaphragm is directly coupled to the force vector. Hence, in the EMT speaker, the diaphragm depends upon mechanical rigidity in order to correctly follow the driving force. This necessitates the use of a stiff cone structure having appreciable mass. Because of this construction and due to surface resonances on the diaphragm, polymodal distortion occurs in appreciable amounts. The diaphragm of the presently described electrostatic transducer, on the other hand, experiences the same force vector (both in magnitude and direction) at all points along its surface. Since the force vector is uniformly distributed over the diaphragm of the electrostatic transducer, as contrasted to the singular driving point of the electromagnetic transducer, motional feedback becomes a practical consideration since each point on the EST diaphragm may be controlled by localized feedback through a system of distributed sensor electrodes. However, the electrostatic transducer even without any feedback means has potentially much better control over its diaphragm motion than the electromagnetic transducer.

In addition to the advantages derived from its isophasic characteristics, the electrostatic transducer has other advantages over electromagnetic transducers. Inherently, high quality EST is lighter in weight, dimensionally thinner, and ultimately less expensive in terms of materials and production costs than the corresponding EMT. Furthermore, the very low mass of the diaphragm 13 (which may be made of ¼-mil metallized mylar film) permits reproduction of frequencies including and somewhat beyond the limits of human hearing. Thus, a true extended range system is realizable without the necessity of an array of specialized speakers of selective frequency range in order to adequately cover the entire audio frequency range, which must be done in case of the EMT. The elimination of an array of speakers, of course, eliminates crossover network distortion and the need for matching and balancing complementary speakers.

It thus appears that the EST system has a potential superior to the EMT with the exception of one problem area: The electrostatic reference field 23 must be derived from a stable source of DC high voltage. Previously such a power source consisted of an AC - DC power supply, DC - DC converter power supply, or ordinary batteries. Ordinary batteries suffer from a very short functional life as compared to the permanent magnetic field which is commonly utilized in the EMT. The standard DC power supply suffers from high initial expense, relatively large size, and dependency upon the power mains for operation. Thus, in order to realize freedom from external power sources, the EST must have a stable source of DC high voltage having a very long functional lifetime.

The present invention solves this problem by utilizing a solid electrolyte cell for the polarizing source 23. The solid electrolyte cell used as the polarizing source is based upon the Ag/AgCl/Cl$_2$ system, in which potassium tetrachloride serves as a low pressure source of chlorine vapor. It provides without compromise the conditions of an ideal polarization source for electrostatic transducers. It may be demonstrated mathematically that the acoustic output of the EST is a direct function of the electrostatic reference field voltage E$o$:

$$v = \frac{-2\epsilon_o}{\left(\frac{Z'm}{s}\right)} \left(\frac{E_o}{d}\right) \left(\frac{e}{2d}\right)$$

where:
$v =$ average membrane velocity (m/sec)
$e =$ signal voltage
$Ec =$ bias voltage (refer to 23 in FIGS. 1, 2, 3, 4, 5)
$eo =$ dielectric constant of medium (8.85.10—12 farads/meter for air)
$d =$ separation between electrodes ($m$)
$s =$ effective diaphragm area ($m^2$)
$Z'm =$ sum of radiation and mechanical impedances of EST (mechanical ohms).

Such mathematical equations indicate that the bias potential of polarizing source 23 should be as high as practical in order to obtain adequate acoustic output capabilities. The actual potential employed is limited by interelectrode medium and spacing. For air, a usable figure for this is approximately 100 volts mil. In the solid electrolyte battery all cell ingredients are chemically inert except for the silver anode and the potassium tetrachloroiodide cathode which interact to furnish the cell energy. The electrolyte is self healing, as any physical break will be spontaneously sealed by the formation of new silver chloride. Life expectancy is on the order of 66 years at an elevated temperature of 60° C. (140° F.), becoming appreciably longer with correspondingly lower temperatures. Unit life is herein defined as terminated when the open circuit potential drops to 5 percent. At this point the cell drops to a new stable potential level approximately 15 percent below the initial potential. This secondary level is based on a Ag/AgC1/IC1 system and has a lifetime on the order of the primary level.

Furthermore, each individual cell (approximately 1.5 volts/cell) of the solid electrolyte battery contains 5 coulombs of charge. Due to the high internal impedance of the cell, this charge cannot be extracted in a short interval of time. In fact, the unit may be short-circuited over prolonged periods without damage. Furthermore, the internal impedance of the cell is small compared to the insulation resistance of the EST, thus no perceptible DC voltage division occurs. Temperature stability is quite good. Size efficiency is excellent. One can normally expect a voltage-volume factor of 150 volts per cubic inch. In fact, the solid electrolyte bias system is considerably smaller in size than present sources. This makes it practical to permanently build the bias system into an EST system, making a self-contained unit analogous to, and as permanent as, the EMT with a permanent magnet. Output potential varies a maximum of plus or minus 6 percent over the temperature range from minus 40° C. to plus 75° C. With all of these features, a very stable miniature, inexpensive, long-lived maintenance free, short-circuited protected, low noise and mechanically rugged, electrostatic polarizing source is provided.

Such construction furthermore results in the possibility of construction of electrostatic earphones having a bias system as described built as an integral physical part because of its small size.

Figure 2:
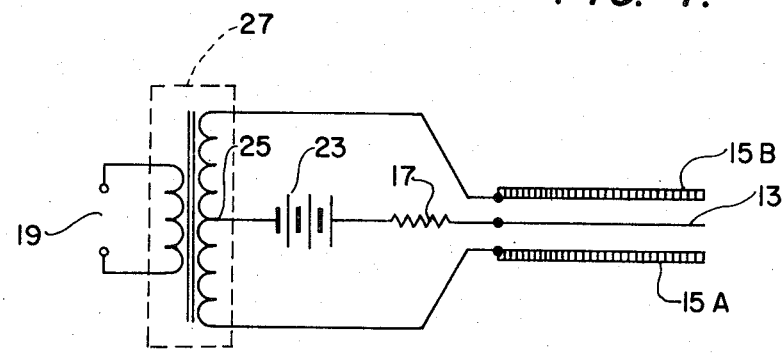
FIG. 2 is a diagram of push-pull balanced electrostatic sound transmitter.
Figure 3:
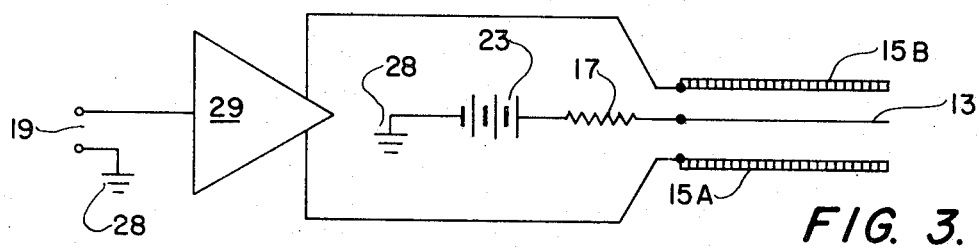
FIG. 3 is a diagram of a push-pull balanced electrostatic sound transmitter as a modification of FIG. 2.

Variations of the basic system are described in FIGS. 2 and 3. In FIG. 2 is shown a push-pull balanced EST with the described polarization system. In this variation two symmetrical fixed electrodes 15A and 15B are provided which are transparent to acoustic sound energy. Diaphragm 13 is connected in series to resistance 17, to polarizing source 23, then to center tap 25 of transformer 27 through which the signal input from 19 is provided.

A further variation is shown in FIG. 3, where bias source 23, resistance 17 and diaphragm 13 are connected in series to ground connection 28. Symmetrically placed electrodes 15A and 15B are connected to differential power amplifier 29 which is driven by signal input 19.

As mentioned previously, due to the uniformly distributed force vector (over the entire diaphragm 13 of the EST herein described) motional feedback becomes a practical consideration, as each point on the diaphragm 13 may be controlled through localized feedback. Hence, even though the EST system has much greater control on diaphragm motion than the comparable EMT, it becomes advantageous to incorporate a motional feedback system to even further enhance acoustic fidelity. Such a system is described in FIGS. 4 and 5. The sound transmitting diaphragm 13 also serves as the compliant conductor of a variable capacitance in which a system of distributed, rigid feedback electrodes 35 act the fixed conductor. Thus the EST system acts as a built-in condenser microphone in which transducer diaphragm 13 serves also as the microphone diaphragm, causing varying capacitance, and therefore, varying potential in electrodes 35. The electrical signal obtained from distributed feedback electrodes 35 is fed back in a negative sense, to reduce distortion products and the effects of externally applied sources such as acoustic loading. This technique tends to correct for improper acoustic loading of the EST. Also provided are a series of distributed fixed driving electrodes 37 which function analogous to rigid fixed electrode 15 previously described. A third set of rigid electrodes is employed to shield the feedback electrode system from the electrostatic field set up by the driving electrodes. The shield electrodes 38 are interlaced between the driving electrode system 37 and the feedback electrode system 35. Employment of shield electrodes 38 insures that the feedback voltage results from diaphragm 13 dynamics exclusively. The shield electrodes 38 may be connected to the circuit common through switch 40 or bootstrapped by connecting them to the output of buffer amplifier 28. The latter is preferable. Resistance 41 functions analogous to resistance 17 herein described. Resistor 42 is necessary to polarize the feedback electrodes. It serves a purpose in the feedback system analogous to that of resistor 17 in the driving system. Solid electrolyte battery polarizing source 23 is also provided as previously described herein. Feedback signal from electrodes 35 is fed through feedback line 45 to summing point 43 for inclusion into differential power amplifier 29, which is fed by signal input 19 as well as the feedback signal from distributed electrodes 35. The feedback signal is then incorporated into the source signal, as is well known in the art.

Figure 5:
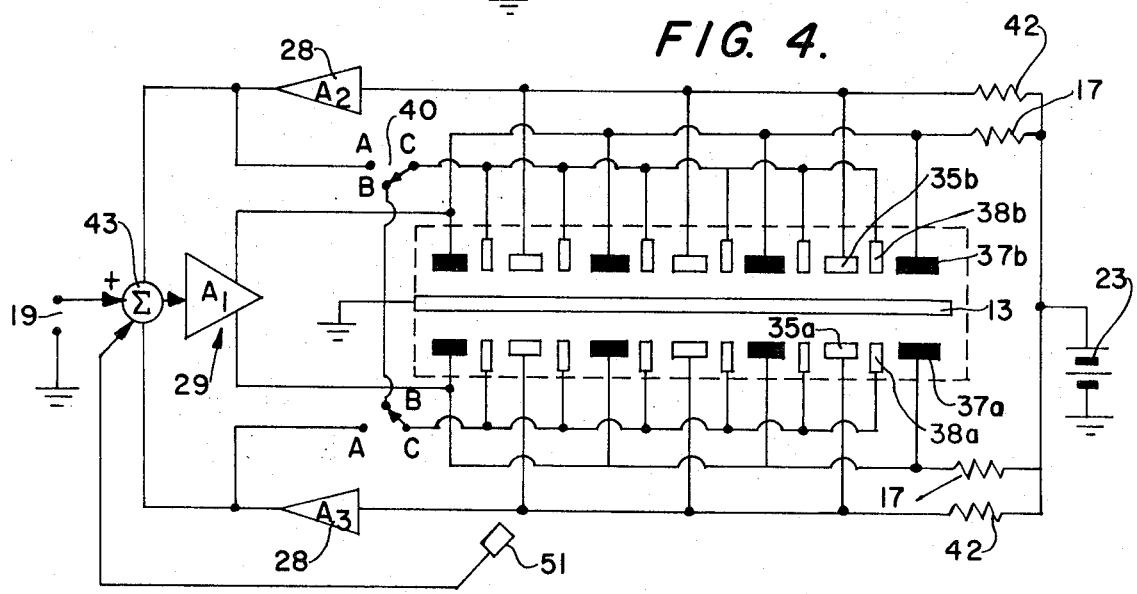
FIG. 5 is a schematic diagram of a push-pull balanced electrostatic sound transmitter system utilizing motional feedback in conjunction with remote microphone feedback.

The system of FIG. 5 is analogous to the push-pull balanced electrostatic system of FIG. 3 with the addition of distributed symmetrical motional feedback electrodes 35A and 35B, driving electrodes 37A, 37B and shielding electrodes 38A and 38B, with the function being apparent as previously described. The system of FIG. 5 provides motional feedback for a push-pull balanced system.

Figure 4:
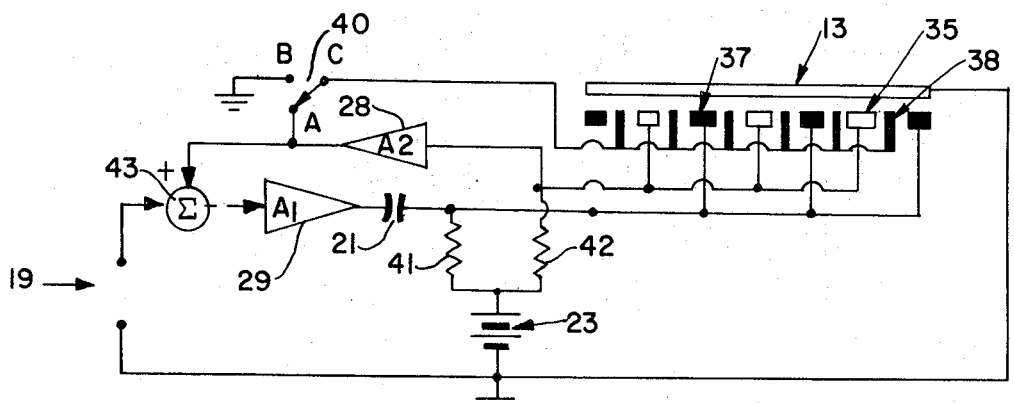
FIG. 4 is a schematic diagram of a single-ended electrostatic sound transmitter utilizing motional feedback.

A further variation is the provision of a remote microphone feedback system utilizing remote microphone(s) 51 providing feedback into summing point 43, which may be used either in conjunction with a distributed motional feedback system as shown in FIGS. 4 or 5, or independent of such a motional feedback system with any of the variations described herein or with any sound transducer system, either EST, EMT, or other type. The feedback microphone 51 is activated by acoustic energy produced by the entire sound-production system. Feedback here functions as a direct result of acoustic energy generated by the transmitter, not merely as a function of diaphragm movement only, as previously described. However, remote feedback microphone 51 operates at any point in the transmission sound field to control sound at that point in space and does provide actual acoustical feedback control; that is, the acoustic transmitter and the acoustic transmission path are incorporated into a closed-loop system. Thus remote feedback microphone(s) 51 controls sound at any point in space, whereas the previously mentioned distributed feedback controlled only the local movement of diaphragm 13.

Figure 6:
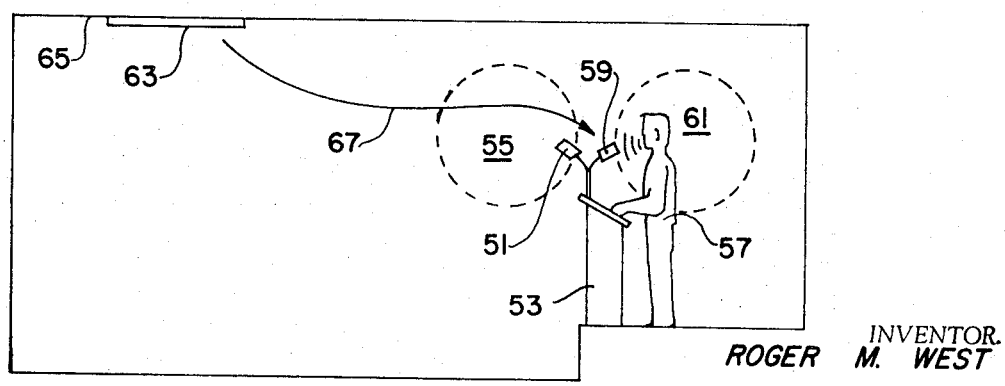
FIG. 6 is a schematic diagram of an application of remote microphone feedback to a public address system.

In FIG. 6 is shown a typical application of the remote microphone feedback described. The problem of acoustic reverberation in large rooms is well known. Also well known is the "squeal" of feedback through a public address microphone. These undesirable features may be controlled by placing remote microphone 51 at the speaker's podium 53. Microphone 51 is directional, its "live zone" generally shown by the space 55 is directed toward the sound source 63, and is so positioned that its "dead zone" is directed toward speaker 57. Speaker's microphone 59 has its "live zone" 61 directed toward speaker 57, with the acoustic speaker 63 positioned in the ceiling 65 as shown. The potential acoustic feedback path between speaker 63 and microphone 59 is shown by arrow 67. Loudspeaker sound is received by the remote control microphone 51 before it reaches the speaker's microphone 59. Gain of the amplifier system is thus adjusted automatically by feedback from microphone 51 to prevent oscillation of the system.

In public address systems that employ more than one sound source it may be necessary to use more than one remote control microphone 51.

Figure 7:
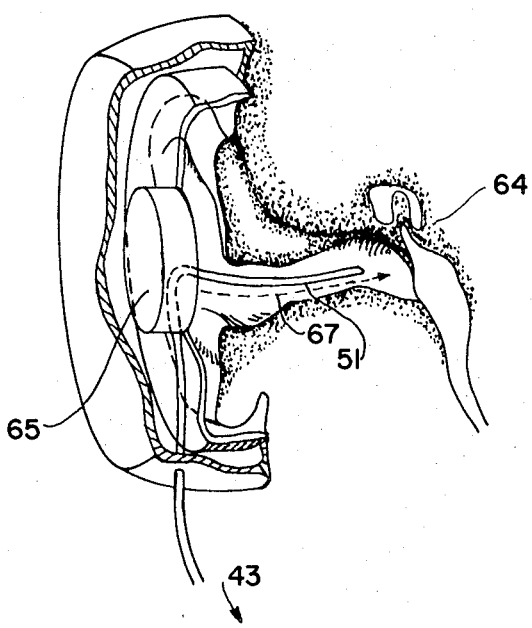
FIG. 7 is a schematic diagram of remote microphone feedback utilized in controlling sound pressures at the eardrum.

FIG. 7 shows the remote control microphone 51 in the form of a small probe placed near the eardrum 64. The sound source 65 may be either a loudspeaker or earphone. The probe microphone signal is fed back to the sound source amplification system in order to eliminate undesirable characteristics of the acoustic transmitter 65 and the transmission path 67. Placing the transmission path 67 into a closed-loop system makes it possible to accurately control and regulate sound at any point along the transmission path 67, hence giving the research or clinical audiologist a leverage over the acoustic stimulus that previously was not possible.

The polarizing source identified above is, of course, only one of several solid electrolyte batteries which may be used.

I claim:

1. An electrostatic transducer system comprising, an electrically activated acoustic transducer consisting of fixed driving electrode means, fixed feedback electrode means, and fixed acoustically transparent shield electrode means and a movable diaphragm, a direct current polarizing source imposing on said transducer a substantially constant polarizing charge, a signal input source imposing on said driving electrode means and said diaphragm a varying signal, said signal interacting with said constant charge to cause said transducer to produce acoustic energy proportional to said varying signal, and feedback means carrying a feedback signal produced in said feedback electrode means to said signal input source to adjust the amplitude of said varying signal, said shield electrode means being discrete from said diaphragm and being positioned between adjacent driving electrode means and feedback electrode means and shielding said feedback electrode means from the electrostatic field of said driving electrode means.

2. A system according to claim 1 in which each of said driving electrode means, feedback electrode means and shield electrode means comprises a plurality of individual electrodes distributed over an area around one surface area of said diaphragm, one electrode of said shield electrode means interposed between each pair of adjacent electrodes of said feedback electrode means and of said driving electrode means.

3. An electrostatic transducer system according to claim 2 in which said driving electrode means, said feedback electrode means and said shield electrode means further comprises a driving electrode, a feedback electrode and a shield electrode placed proximate the opposite side of said diaphragm from said plurality of driving, shield, and feedback electrodes.

4. An electrostatic transducer system according to claim 1, in which said direct current polarizing source comprises a solid electrolyte battery.